(12) United States Patent
Tang et al.

(10) Patent No.: US 8,598,827 B2
(45) Date of Patent: Dec. 3, 2013

(54) CONTROL SYSTEM OF MILLING MACHINE

(75) Inventors: Chia-Hui Tang, Taichung (TW);
Chau-Shing Wang, Taichung (TW);
Yu-Lin Juan, Taichung (TW);
Tsair-Rong Chen, Changhua County (TW); Paul Chang, Taichung (TW)

(73) Assignees: Buffalo Machinery Company Limited,
Taichung (TW); The Department of Electrical Engineering, National Chang-Hua University of Education,
Changhua County (TW)

( * ) Notice: Subject to any disclaimer, the term of this patent is extended or adjusted under 35 U.S.C. 154(b) by 239 days.

(21) Appl. No.: 13/151,907

(22) Filed: Jun. 2, 2011

(65) Prior Publication Data

US 2012/0306420 A1    Dec. 6, 2012

(51) Int. Cl.
*G05B 7/00*     (2006.01)

(52) U.S. Cl.
USPC .......................... 318/460; 318/560; 318/571

(58) Field of Classification Search
USPC ......... 318/460, 560, 561, 571, 572, 609, 610;
409/133, 131; 269/86
See application file for complete search history.

(56) References Cited

U.S. PATENT DOCUMENTS

| | | | |
|---|---|---|---|
| 2007/0033785 A1* | 2/2007 | Kohring | 29/27 C |
| 2010/0066291 A1* | 3/2010 | Chang et al. | 318/460 |

* cited by examiner

*Primary Examiner* — Lincoln Donovan
*Assistant Examiner* — Iftekhar Mustafa
(74) *Attorney, Agent, or Firm* — Banner & Witcoff, Ltd.

(57) ABSTRACT

A control system of a milling machine is disclosed. The milling machine has an overarm, a spindle connected to a cutter, a spindle motor, and an X-axis motor, a Y-axis motor and a Z-axis motor. The control system includes a vibration sensor for detecting a vibration level of the spindle. The control system also includes a central control unit configured to adjust a rotation speed of at least one of the X-axis motor, the Y-axis motor, and the Z-axis motor to bring a load current of at least one of the motors to be within a corresponding current range, and configured to adjust a rotation speed of the spindle motor to bring the vibration level to be within a vibration range.

9 Claims, 4 Drawing Sheets

US 8,598,827 B2

CONTROL SYSTEM OF MILLING MACHINE

BACKGROUND OF THE INVENTION

1. Field of the Invention

The invention relates to a control system, and more particularly to a control system of a milling machine.

2. Description of the Related Art

Referring to FIG. 1, a milling machine 1 disclosed in R.O.C. Patent Publication Number 479585 includes a column 11, an overarm 12 and a clamp 13 movably mounted to the column 11, a spindle 15 extending rotatably through the overarm 12 and mounted with a cutter 14, a ball screw 16 extending pivotably through the column 11, and a motor 17 mounted on the column 11 for driving the rotation of the ball screw 16. The clamp 13 is adapted for clamping a work piece (not shown in the Figure). The ball screw 16 includes a first threaded section 161 and a second threaded section 162 that extend threadedly through the overarm 12 and the clamp 13, respectively, and that have opposite threading directions.

When the motor 17 drives the ball screw 16, the overarm 12 and the clamp 13 move toward or away from each other. However, movement of the cutter 14 may be restricted, which may make some machining tasks more difficult or more time consuming to accomplish.

SUMMARY OF THE INVENTION

An object of the present invention is to provide a control system of a milling machine that can increase a machining rate of a work piece, shorten processing time, and increase manufacturing efficiency of the milling machine.

An aspect of the invention is a control system for a milling machine. The milling machine has an overarm, a spindle extending rotatably through the overarm and connected to a cutter, a spindle motor for driving rotation of the spindle, and an X-axis motor, a Y-axis motor and a Z-axis motor for driving movement of the overarm along the X-axis, the Y-axis, and the Z-axis, respectively. The control system includes a vibration sensor to be mounted on the overarm for detecting a vibration level of the spindle and for generating a vibration signal. The control system also includes a central control unit coupled electrically to the vibration sensor to receive the vibration signal from the vibration sensor.

The central control unit is configured to be coupled to and to receive a load current of at least one of the spindle motor, the X-axis motor, the Y-axis motor, and the Z-axis motor. The central control unit is configured to adjust a rotation speed of at least one of the X-axis motor, the Y-axis motor, and the Z-axis motor to bring the load current received by the central control unit to be within a corresponding current range. The central control unit is configured to adjust a rotation speed of the spindle motor to bring the vibration level to be within a vibration range.

An advantage of the control system of a milling machine according to this invention includes detection of the load current and the vibration level, which permits the rotation speeds of the X-axis motor, the Y-axis motor, the Z-axis motor, and the spindle motor to be maintained at preferred limits. As a result, the milling rate of a work piece may be increased, processing time may be shortened, and the manufacturing efficiency of the milling machine may be increased.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
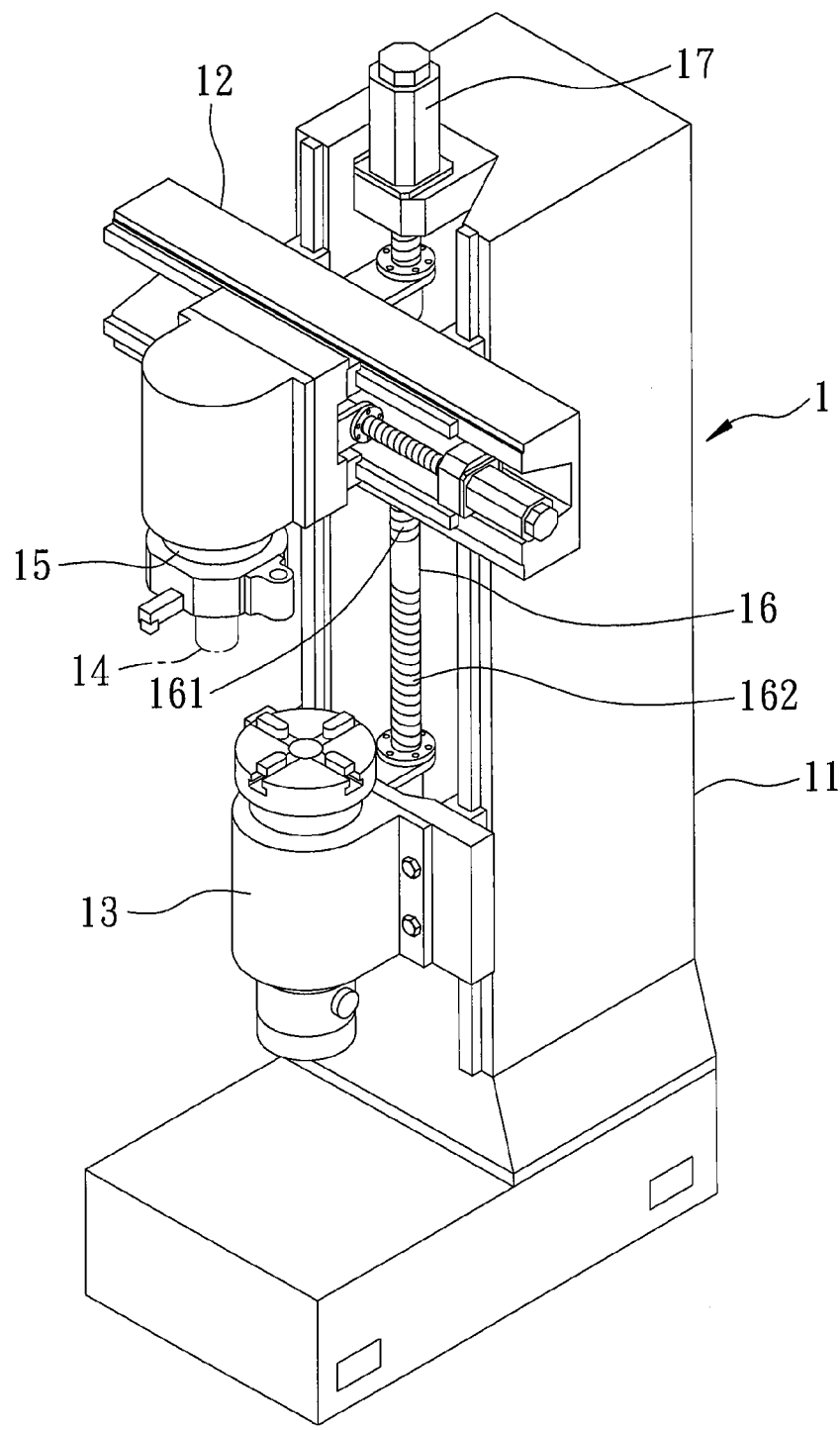
FIG. 1 is a perspective view of a conventional milling machine.
Figure 2:
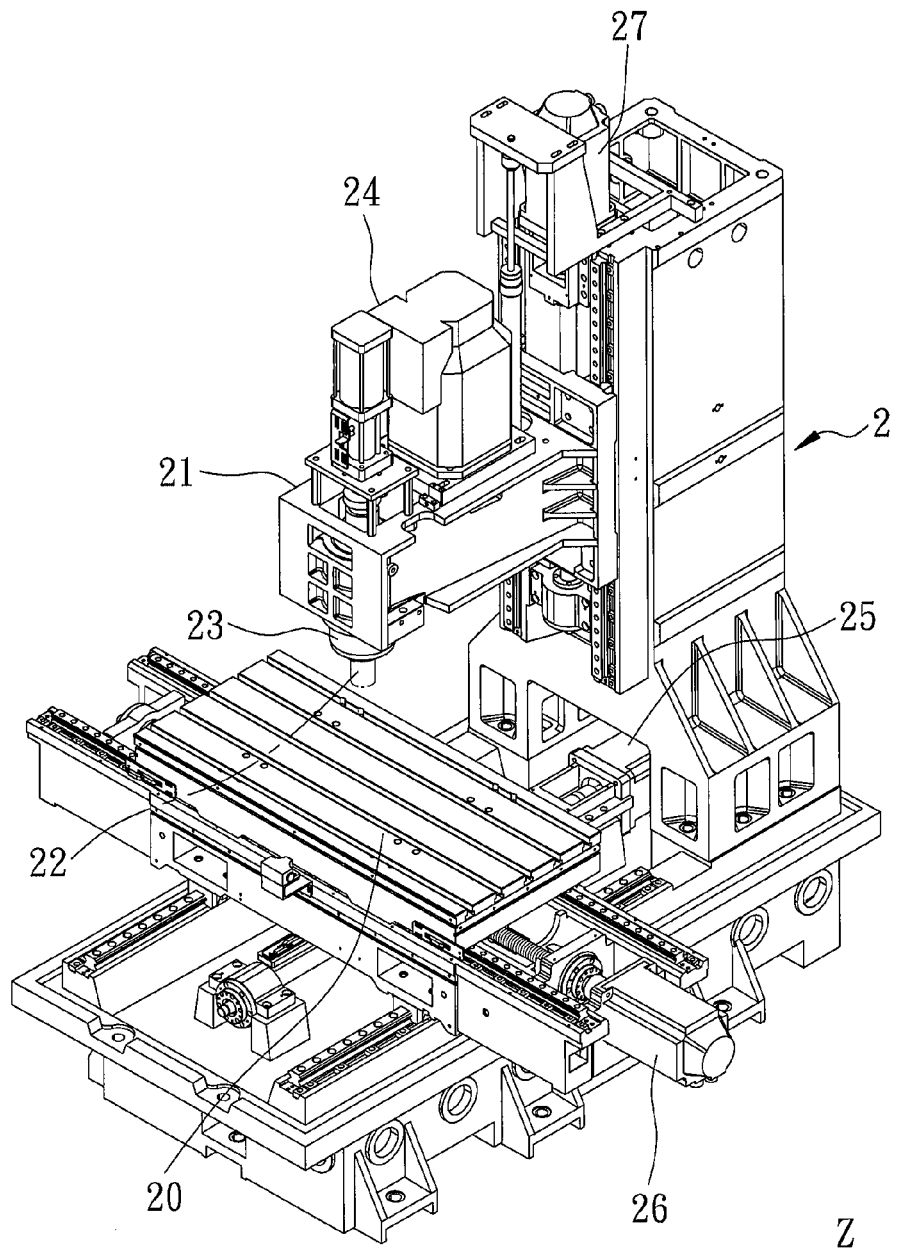
FIG. 2 is a perspective view of a control system mounted on a milling machine according to a preferred embodiment of the present invention.
Figure 3:
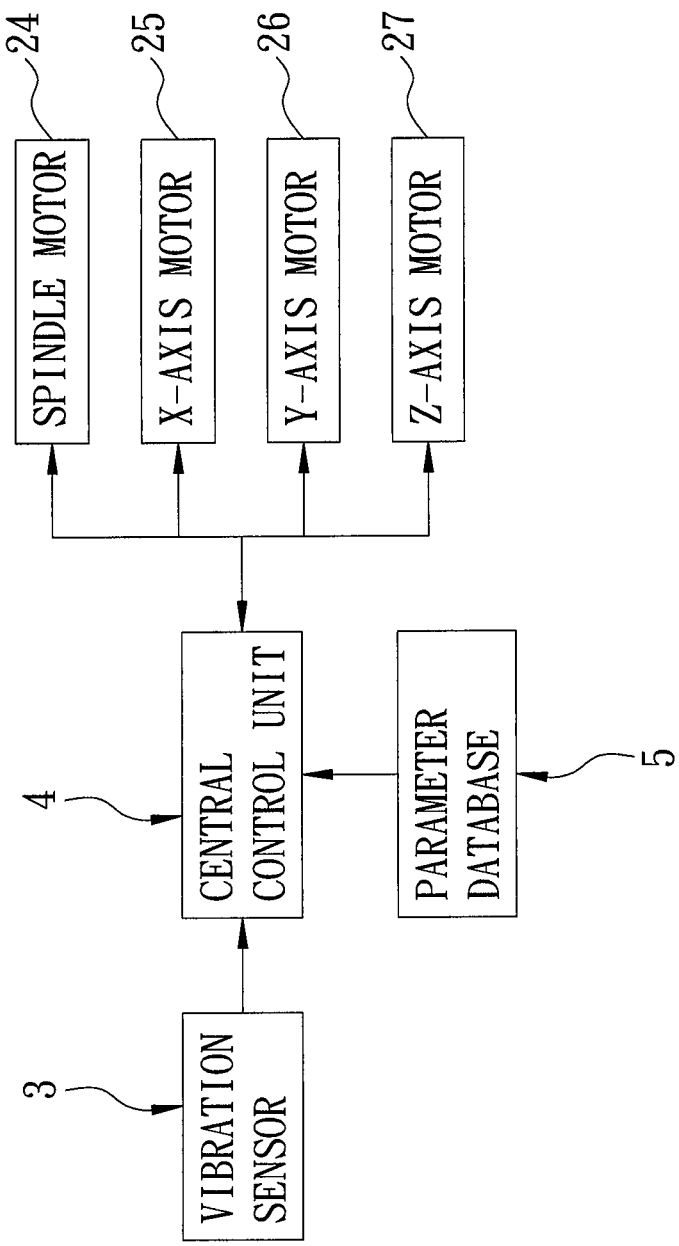
FIG. 3 is a block diagram of the preferred embodiment.

Referring to FIGS. 2 and 3, the preferred embodiment of a control system according to the present invention is shown to be adapted to be mounted on a milling machine 2. The milling machine 2 has a platform 20 for supporting a work piece (not shown), an overarm 21 facing the platform 20, a spindle 23 extending rotatably through the overarm 21 and connected to a cutter 22, a spindle motor 24 for driving rotation of the spindle 23, and an X-axis motor 25, a Y-axis motor 26, and a Z-axis motor 27 for driving movement of the overarm 21 and the platform 20 relative to each other along the X-axis, Y-axis, and Z-axis directions respectively. The control system of the milling machine 2 comprises a vibration sensor 3 and a central control unit 4. The vibration sensor 3 is mounted on the overarm 21 for detecting a vibration level ($V_B$) of the spindle 23, and for converting the vibration energy into a vibration signal, which is a voltage signal, for subsequent output.

The central control unit 4 is coupled electrically to the vibration sensor 3 to receive the vibration signal from the vibration sensor 3. The central control unit 4 is configured to be coupled to at least one of the spindle motor 24, the X-axis motor 25, the Y-axis motor 26, the Z-axis motor 27, and the vibration sensor 3 for receiving the load currents ($I_S$) ($I_X$) ($I_Y$) ($I_Z$) from the spindle motor 24, the X-axis motor 25, the Y-axis motor 26, and the Z-axis motor 27, and for determining the vibration level ($V_B$) from the vibration signal from the vibration sensor 3. Four current ranges ($I_{SMAX}$) ($I_{XMAX}$) ($I_{YMAX}$) ($I_{ZMAX}$) corresponding to the load currents (Is), (Ix), (Iy), and (Iz), and a vibration range ($V_{BMAX}$) are predetermined.

The central control unit 4 is configured to increase or decrease a rotation speed of at least one of the X-axis motor 25, the Y-axis motor 26, and the Z-axis motor 27 to bring the load current Is, Ix, Iy, Iz received by the central control unit 4 to be within the corresponding current range $I_{SMAX}$, $I_{XMAX}$, $I_{YMAX}$, $I_{ZMAX}$. The central control unit 4 is also configured to increase or decrease a rotation speed of the spindle motor 24 to bring the vibration level ($V_B$) to be within the vibration range ($V_{BMAX}$).

The maximum cutting (rotation) speed of the spindle motor 24 and the maximum feeding (rotation) speeds of the X-axis motor 25, the Y-axis motor 26, and the Z-axis motor 27 are determined by the upper limits of the vibration range ($V_{SMAX}$) and the current ranges ($I_{SMAX}$), ($I_{XMAX}$), ($I_{YMAX}$), ($I_{ZMAX}$). The vibration range ($V_{BMAX}$) and the current ranges ($I_{SMAX}$), ($I_{XMAX}$), ($I_{YMAX}$), ($I_{ZMAX}$) are configured based on reference parameters that may include a cutter type, a cutter diameter, a cutter teeth quantity, a cutter feeding limit, a workpiece material, a reference cutting speed of the spindle motor 24, a reference vibration range, a reference current range, and a reference feeding speed of at least one of the X-axis motor 25, the Y-axis motor 26, and the Z-axis motor 27, etc. The reference vibration range and the reference current range may each be based on one or more of the cutter type, the cutter diameter, the cutter teeth quantity, the cutter feeding limit, and the workpiece material. The reference parameters may be stored in a parameter database 5 coupled to the central control unit 4.

The central control unit 4 may be configured to vary the rotation speed of at least one of the X-axis motor 25, the Y-axis motor 26, and the Z-axis motor 27 in proportion to adjustment to the rotation speed of the spindle motor 24. The central control unit 4 may be configured to vary the rotation speed of the spindle motor 24 in proportion to adjustment of the rotation speed of at least one of the X-axis motor 25, the Y-axis motor 26, and the Z-axis motor 27. In addition, the rotation speed of the spindle motor 24 may be varied proportionately with the speed of one or more of the X-axis motor 25, the Y-axis motor 26, and the Z-axis motor 27.

Figure 4:
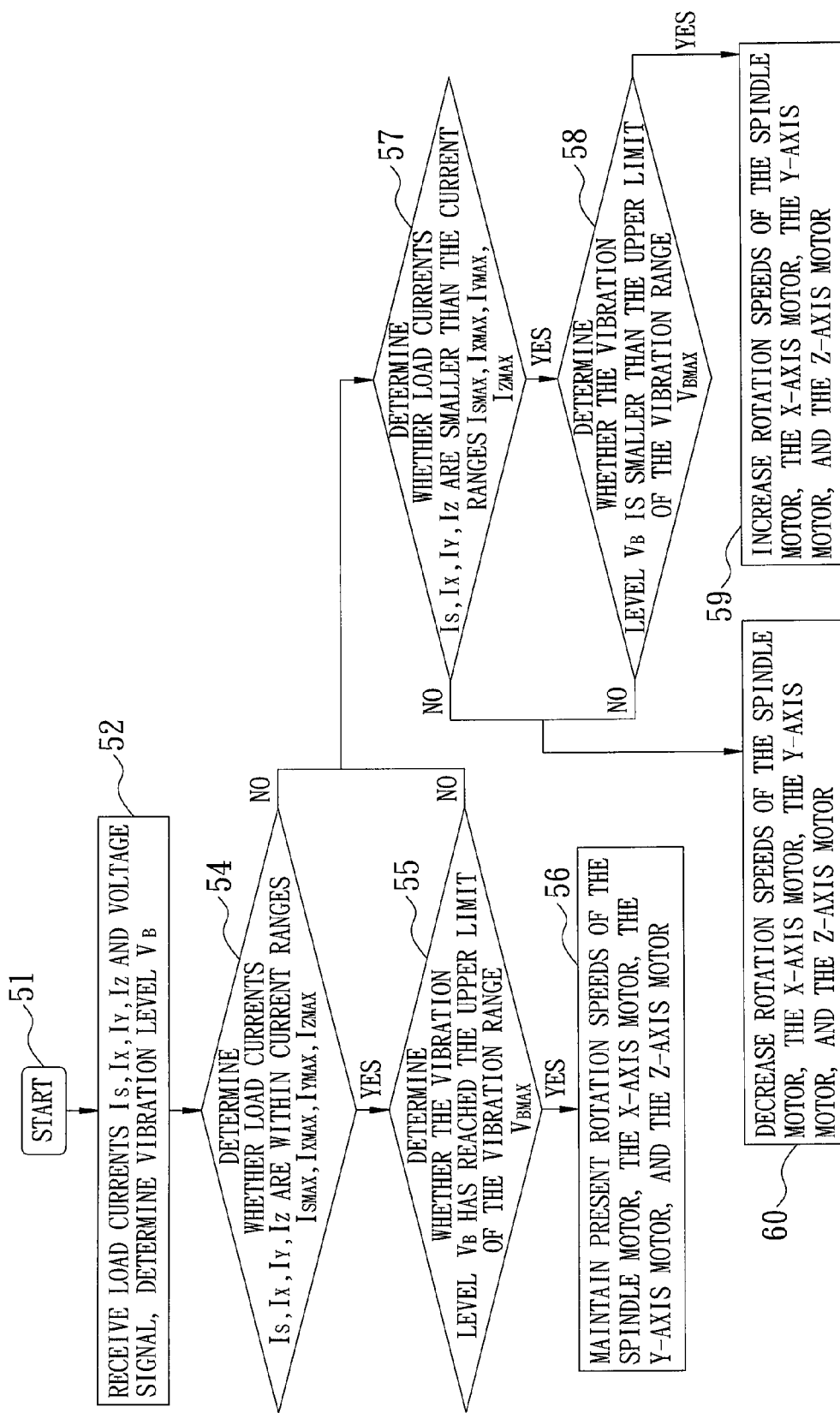
FIG. 4 is a flowchart to illustrate operation of the preferred embodiment.

Referring further to FIG. 4, a process flow of the preferred embodiment includes:

Step 51: The milling machine 2 is started.

Step 52: The central control unit 4 receives the load currents ($I_S$), ($I_X$), ($I_Y$), ($I_Z$) from the spindle motor 24, the X-axis motor 25, the Y-axis motor 26, and the Z-axis motor 27. The central control unit 4 also receives the voltage signal from the vibration sensor 3, and determines the vibration level ($V_B$) of the rotation of the spindle 23 from the vibration signal. The flow then goes to step 54.

Step 54: The central control unit 4 determines whether the load currents ($I_S$), ($I_X$), ($I_Y$), ($I_Z$) from the spindle motor 24, the X-axis motor 25, the Y-axis motor 26, and the Z-axis motor 27 are all within the current ranges ($I_{SMAX}$), ($I_{XMAX}$), ($I_{YMAX}$), ($I_{ZMAX}$). If the result of the determination is affirmative, the flow goes to step 55. Otherwise, the flow goes to step 57.

Step 55: Based on the vibration signal from the vibration sensor 3, the central control unit 4 determines whether the vibration level ($V_B$) has reached the upper limit of the vibration range ($V_{BMAX}$). If the result of the determination is affirmative, the flow goes to step 56. Otherwise, the flow goes to step 57.

Step 56: The central control unit 4 maintains the present rotation speeds of the spindle motor 24, the X-axis motor 25, the Y-axis motor 26, and the Z-axis motor 27.

Step 57: The central control unit 4 determines whether the load currents ($I_S$), ($I_X$), ($I_Y$), ($I_Z$) from the spindle motor 24, the X-axis motor 25, the Y-axis motor 26, and the Z-axis motor 27 are all smaller than the current ranges ($I_{SMAX}$), ($I_{XMAX}$), ($I_{ZMAX}$), ($I_{ZMAX}$). If the result of the determination is affirmative, the flow goes to step 58. Otherwise, the flow goes to step 60.

Step 58: Based on the vibration signal from the vibration sensor 3, the central control unit 4 determines whether the vibration level ($V_B$) is smaller than the upper limit of the vibration range ($V_{BMAX}$). If the result of the determination is affirmative, the flow goes to step 59. Otherwise, the flow goes to step 60.

Step 59: The central control unit 4 increases the rotation speed of at least one of the spindle motor 24, the X-axis motor 25, the Y-axis motor 26, and the Z-axis motor 27. Preferably, the central control unit 4 increases the rotation speed of each of the spindle motor 24, the X-axis motor 25, the Y-axis motor 26, and the Z-axis motor 27. In this embodiment, rotation speeds are increased by a fixed amount, such as a fixed percentage of the respective rotation speed upper limit. The percentage may be 5%.

Step 60: The central control unit 4 decreases the rotation speed of the spindle motor 24, and decreases the rotation speed of the X-axis motor 25, the Y-axis motor 26, and the Z-axis motor 27. In this embodiment, each of the rotation speeds is decreased by a fixed amount, such as a fixed percentage of the respective rotation speed upper limits. The percentage may be 5%.

Steps 52 to step 60 are repeated until the milling machine 2 is powered off and the processing operation is stopped.

An advantage of the control system of a milling machine 2 according to this invention includes detection of the load current and the vibration level, which permits the rotation speeds of the X-axis motor 25, the Y-axis motor 26, the Z-axis motor 27, and the spindle motor 24 to be maintained at preferred limits. As a result, the milling rate of a work piece may be increased, processing time may be shortened, and the manufacturing efficiency of the milling machine 2 may be increased.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A control system of a milling machine, the milling machine having an overarm, a spindle extending rotatably through the overarm and connected to a cutter, a spindle motor for driving rotation of the spindle, and an X-axis motor, a Y-axis motor and a Z-axis motor for driving movement of the overarm along the X-axis, the Y-axis, and the Z-axis, respectively, said control system comprising:

a vibration sensor to be mounted on the overarm detecting a vibration level of the spindle and for generating a vibration signal; and a central control unit coupled electrically to said vibration sensor to receive the vibration signal from said vibration sensor, said central control unit being configured to be coupled to and to receive a load current of at least one of the spindle motor, the X-axis motor, the Y-axis motor, and the Z-axis motor, wherein said central control unit is configured to adjust a rotation speed of at least one of the X-axis motor, the Y-axis motor, and the Z-axis motor to bring the load current received by said central control unit to be within a corresponding current range, and wherein said central control unit is configured to adjust a rotation speed of the spindle motor to bring the vibration level to be within a vibration range;

wherein the vibration range and the corresponding current range are configured based on a reference cutting speed of the spindle motor and a reference feeding speed of at least one of the X-axis motor, the Y-axis motor and the Z-axis motor, said control system further comprising a parameter database coupled to said central control unit and from which said central control unit acquires each of the vibration range and the corresponding current range.

2. The control system of a milling machine as claimed in claim 1, wherein said central control unit is configured to receive the load current of each of the X-axis motor, the Y-axis motor and the Z-axis motor, and there are three current ranges, each corresponding to the load current of one of the X-axis motor, the Y-axis motor, and the Z-axis motor.

3. The control system of a milling machine as claimed in claim 1, wherein said central control unit is configured to receive the load current of each of the X-axis motor, the Y-axis motor and the Z-axis motor, and is configured to decrease the rotation speed of at least one of the X-axis motor, the Y-axis motor, and the Z-axis motor when the load current of at least one of the X-axis motor, the Y-axis motor and the Z-axis motor exceeds the corresponding current range in order to bring the load current of each of the X-axis motor, Y-axis motor and the Z-axis motor to be within corresponding current range.

4. The control system of a milling machine as claimed in claim 1, wherein said central control unit is configured to receive the load current of each of the X-axis motor, the Y-axis motor and the Z-axis motor, and is configured to decrease the rotation speed of at least one of the spindle motor, the X-axis motor, the Y-axis motor, and the Z-axis motor when the load currents of the X-axis motor, the Y-axis motor and the Z-axis motor do not exceed the corresponding current range and the vibration level is outside the vibration range.

5. The control system of a milling machine as claimed in claim 1, wherein said central control unit is configured to receive the load current of each of the X-axis motor, the Y-axis motor and the Z-axis motor, and is configured to increase the rotation speed of at least one of the spindle motor, the X-axis motor, the Y-axis motor, and the Z-axis motor, the Y-axis motor and the Z-axis motor do not exceed the corresponding current range and the vibration level is inside the vibration range.

6. The control system of a milling machine as claimed in claim 1, wherein said parameter database includes a reference vibration range and a reference current range that are each based on one or more of a cutter type, a cutter diameter, a cutter teeth quantity, a cutter feeding limit, and a workpiece material.

7. The control system of a milling machine as claimed in claim 1, wherein said central control unit is configured to vary the rotation speed of at least one of the X-axis motor, the Y-axis motor and the Z-axis motor in proportion to adjustment to the rotation speed of the spindle motor, and to vary the rotation speed of the spindle motor in proportion to adjustment of the rotation speed of at least one of the X-axis motor, the Y-axis motor and the Z-axis motor.

8. A milling machine comprising:
an overarm;
a spindle extending rotatably through said overarm and adapted for connection to a cutter;
a spindle motor for driving rotation of said spindle;
an X-axis motor, a Y-axis motor and a Z-axis motor for driving movement of said overarm along the X-axis, the Y-axis, and the Z-axis, respectively;
a vibration sensor mounted on said overarm for detecting a vibration level of said spindle and for generating a vibration signal; and
a central control unit coupled electrically to said vibration sensor to receive the vibration signal from said vibration sensor, said central control unit being coupled to and receiving a load current of at least one of said spindle motor, said X-axis motor, said Y-axis motor, and said Z-axis motor,
wherein said central control unit is configured to adjust a rotation speed of at least one of said X-axis motor, said Y-axis motor, and said Z-axis motor to bring the load current received by said central control unit to be within a corresponding current range, and
wherein said central control unit is configured to adjust a rotation speed of said spindle motor to bring the vibration level to be within a vibration range;
wherein the vibration range and the corresponding current range are configured based on a reference cutting speed of the spindle motor and a reference feeding speed of at least one of the X-axis motor, the Y-axis motor and the Z-axis motor, said control system further comprising a parameter database coupled to said central control unit and from which said central control unit acquires each of the vibration range and the corresponding current range.

9. The milling machine as claimed in claim 8, wherein said parameter database includes a reference vibration range and a reference current range that are each based on one or more of a cutter type, a cutter diameter, a cutter teeth quantity, a cutter feeding limit, and a workpiece material.

\* \* \* \* \*